Dec. 18, 1945.   J. D. LEWIS   2,391,320
MOTOR CONTROL SYSTEM
Original Filed July 7, 1943   4 Sheets—Sheet 1
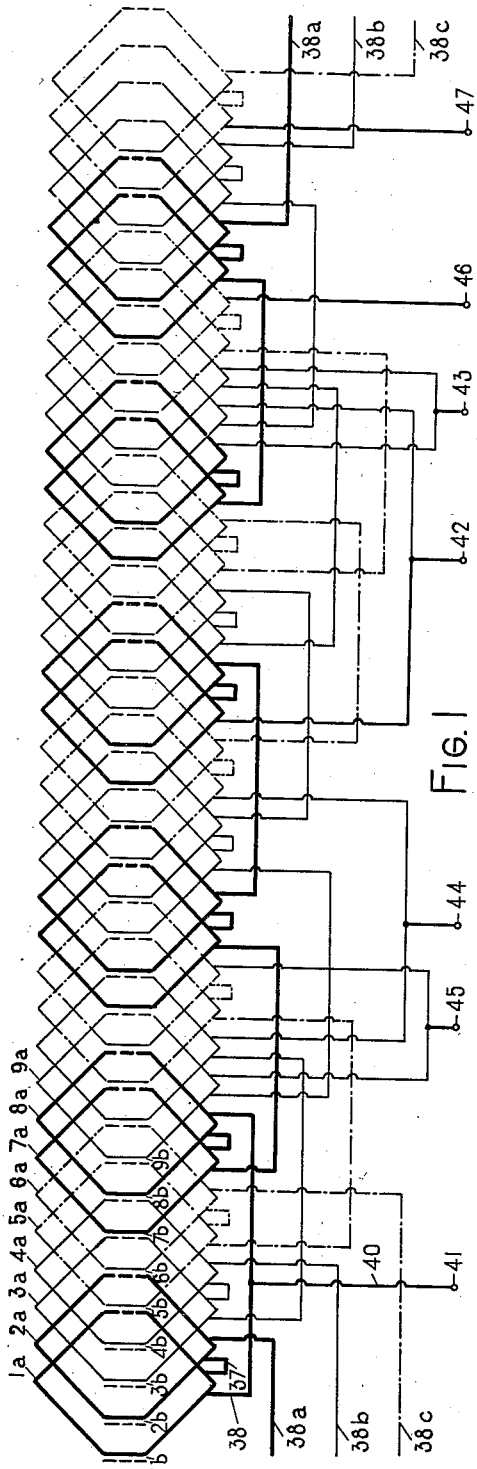
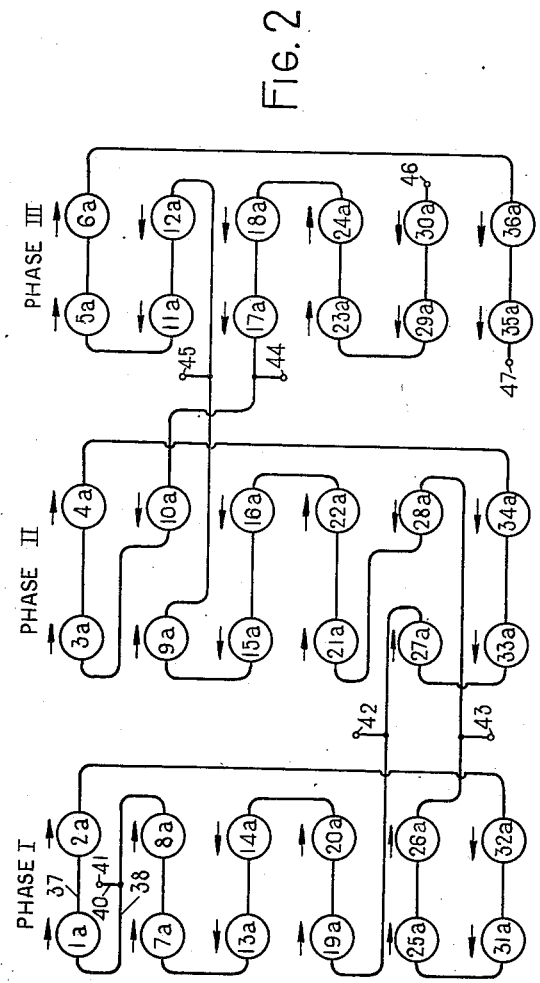
Jacob Daniel Lewis INVENTOR
BY Walter E. F. Bradley ATTORNEY Dec. 18, 1945.  J. D. LEWIS  2,391,320
MOTOR CONTROL SYSTEM
Original Filed July 7, 1943   4 Sheets-Sheet 2

Jacob Daniel Lewis INVENTOR

BY Walter E. P. Bradley ATTORNEY

Dec. 18, 1945.  J. D. LEWIS  2,391,320
MOTOR CONTROL SYSTEM
Original Filed July 7, 1943  4 Sheets-Sheet 3

Jacob Daniel Lewis INVENTOR
BY (signature) ATTORNEY

Dec. 18, 1945.　　　　J. D. LEWIS　　　　2,391,320
MOTOR CONTROL SYSTEM
Original Filed July 7, 1943　　4 Sheets-Sheet 4

Jacob Daniel Lewis INVENTOR

BY Walter T. Bradley ATTORNEY

Patented Dec. 18, 1945

UNITED STATES PATENT OFFICE 2,391,320

MOTOR CONTROL SYSTEM

Jacob Daniel Lewis, Yonkers, N. Y., assignor to Otis Elevator Company, New York, N. Y., a corporation of New Jersey Original application July 7, 1943, Serial No. 493,792. Divided and this application July 14, 1944, Serial No. 544,863

4 Claims. (Cl. 172—276)

The invention relates to control systems for electric motors, especially for elevators.

In many buildings, the supply of electric power to the building is polyphase alternating current. It is of advantage in many instances of industrial motor applications in such buildings to utilize polyphase alternating current motors. In some of these instances, it is desirable to provide motors which may be operated at different speeds. For example, in elevator installations, it is desirable to provide one speed for full speed operation of the elevator and another speed slow enough for the elevator to make accurate stops at the landings. This is especially the case where levelling mechanism is provided for bringing the car to the landing level in case it underruns or overruns a landing in stopping.

This application is a division of application Serial Number 493,792 filed July 7, 1943. The parent application is directed to a motor adapted for operation as a polyphase alternating current motor or as a direct current motor. In the arrangement which is specifically described, the field winding of the motor is arranged for connection to a source of polyphase alternating current to provide a rotating field of a number of pairs of poles to cause operation of the motor at a fast speed. The field winding is also arranged for connection to a source of direct current to cause with the armature winding excited from a direct current source operation of the motor at a slow speed.

The object of the invention is to provide a control system for such motor for effecting the desired excitation of the motor for both fast speed and slow speed operation and for causing slowing down of the motor from fast to slow speed.

Features and advantages of the invention will be apparent from the above statements, the description which follows and appended claims.

In the drawings:

Figure 1 is a developed diagram of the stator winding of a motor embodying the invention;

Figure 2 is a simplified schematic wiring diagram of the stator winding shown in Figure 1;

Figure 5:
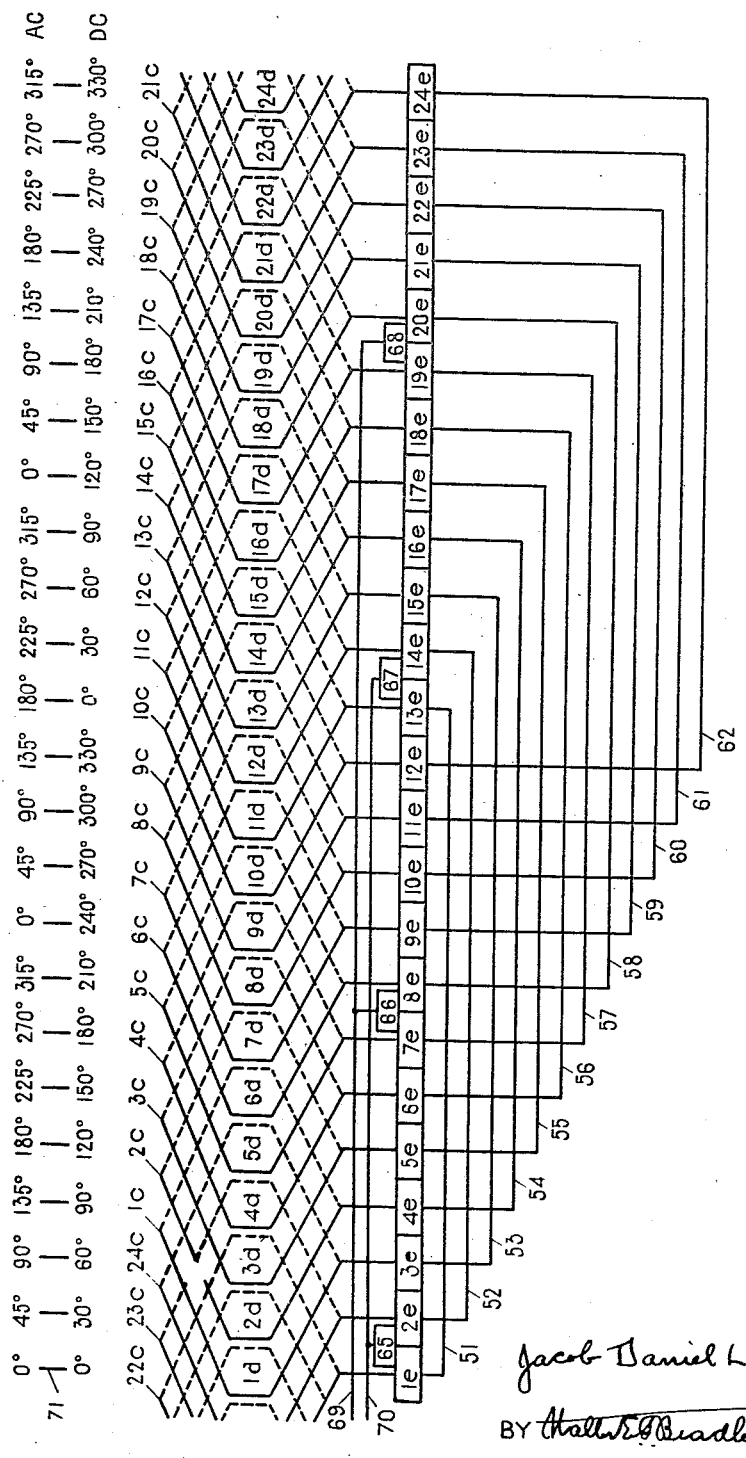
Figure 5 is a developed diagram of the rotor or armature winding of a motor having the stator winding of Figure 1.
Figures 6, 6S:
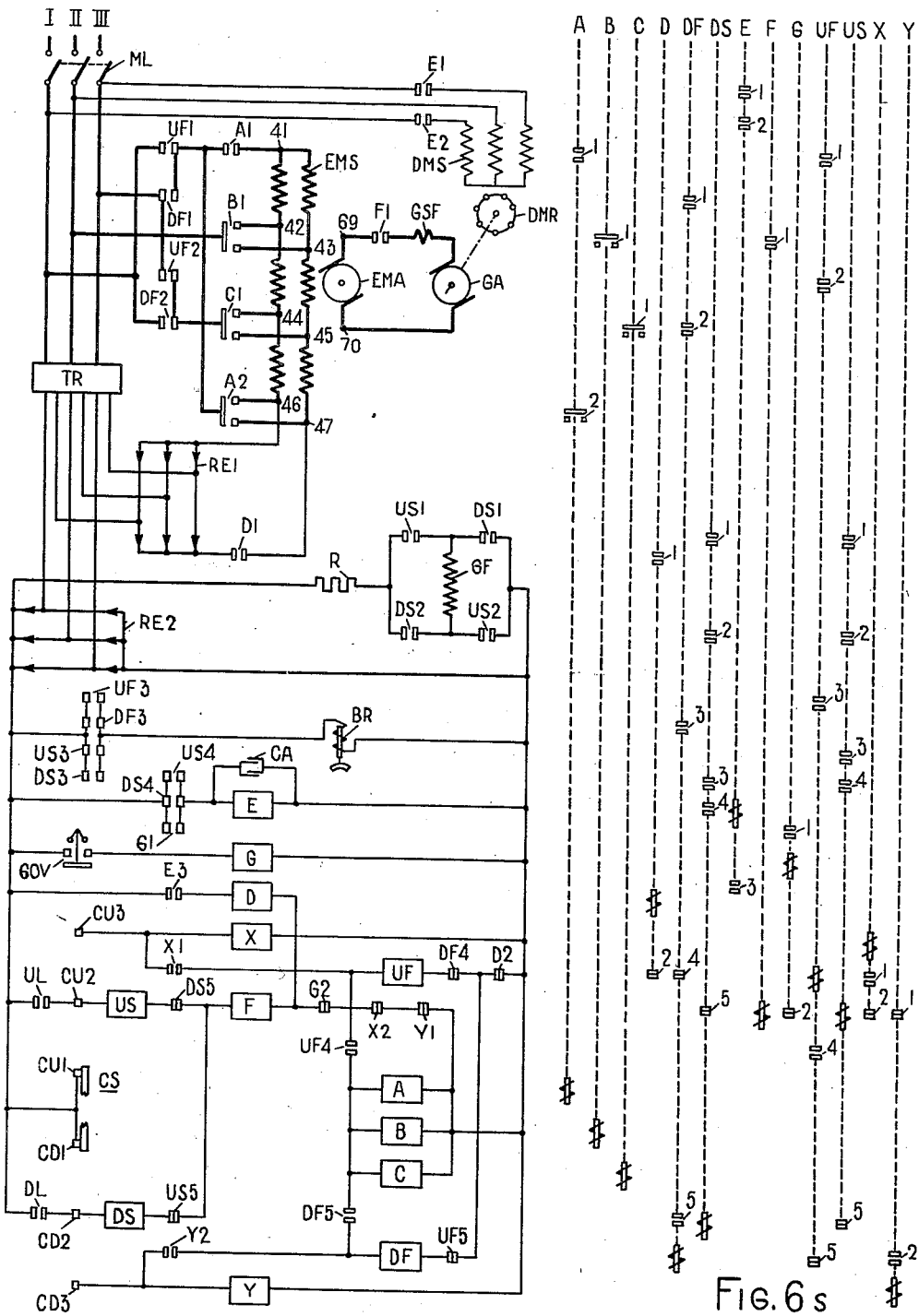

Figure 6 is a simplified wiring diagram in "across-the-line" form of a control system for a motor, having the windings of Figures 1 and 5, utilized as an elevator hoisting motor; and Figure 6s is a key diagram for Figure 6 showing the electromagnetic switches in spindle form with the contacts and coils arranged on the spindles in horizontal alignment with the corresponding contacts and coils in the wiring diagram.

An embodiment of the invention will be described in which the motor operates as a six pole alternating current motor and as a four pole direct current motor.

Considering first the stator winding for operation of the motor as a polyphase alternating current motor, the stator winding is illustrated as a six pole three phase lap winding arranged in 36 slots and distributed in two slots per phase per pole. In the developed view shown in Figure 1, the coils are designated $1a$, $2a$, etc., while the slots are designated $1b$, $2b$, etc. Because of space conditions, reference characters are applied to only the first nine of each. The phase windings are differentiated by heavy, light and dot-dash lines. The pairs of coils per phase per pole are connected by short jumpers designated 37 while other connections for the coils are made by long jumpers designated 38, it being understood that the long jumpers at the ends in Figure 1, specially designated $38a$, $38b$ and $38c$ are connected, being broken off because of the developed view. Seven leads 40 connect points in the stator winding to terminals designated 41, 42, 43, 44, 45, 46 and 47.

The connections of the coils will be more readily understood from the simplified wiring diagram shown in Figure 2. In this figure, the coils are repesented by circles. The coils are of identical form and therefore it may be assumed that the circuit through each coil in Figure 2 will always be from the entering point toward the top, regardless of whether the circuit enters the coil from the right or from the left. Thus, assuming an instant in which current enters coil I from the left, the current flow in the coil is clockwise, whereas at an instant in which current enters coil I from the right, the current flow in the coil is counterclockwise.

The coils are arranged in vertical columns in accordance with their phase, there being six columns and six rows inasmuch as there are two coils per phase per pole. For convenience of switching, the coils of each phase winding are divided into two groups arranged for connection in parallel to provide a delta connected stator winding. This arrangement also facilitates obtaining the desired resistance for direct current excitation. For example, coils $1a$, $2a$, $32a$, $31a$, $25a$ and $26a$ constitute one group of phase I, while coils $8a$, $7a$, $13a$, $14a$, $20a$ and $19a$ constitute the other group, and these groups are connected in parallel between terminals 41 and 42, 43, the latter two terminals being connected together for alternating current excitation. Terminals 42 and 43 are connected to one phase of the supply lines, terminal 41 is connected to terminals 46 and 47, the three of which are connected to another phase of the supply lines, and terminals 44 and 45 are connected together and to the remaining phase of the supply lines, all of which will be seen from the description which follows in connection with Figure 6. Thus the phase windings are connected delta. Assume, for example an instant in which current flow is maximum into terminals 41, 46 and 47 and thus flows out half from terminals 42, 43 and the other half from terminals 44 and 45. Under such conditions, current flows clockwise in coils 1a, 2a, 25a, 26a, 13a, 14a, 23a, 24a, 35a, 36a, 11a, 12a and counterclockwise in coils 32a, 31a, 8a, 7a, 20a, 19a, 6a, 5a, 30a, 29a, 18a and 17a. Assuming clockwise current flow to produce excitation for a north pole, in phase I coils 1a and 2a provide excitation for a north pole, coils 7a and 8a provide excitation for a south pole, etc. and in phase III coils 5a and 6a provide excitation for a south pole, coils 11a and 12a provide excitation for a north pole, etc. Therefore, as a resultant, coils 35a, 36a, 1a and 2a provide excitation for a full north pole, coils 5a, 6a, 7a and 8a provide excitation for the next full south pole, etc., for a total of six poles. Thus a standard three phase delta connected six pole stator winding is provided with the coils of each phase winding arranged in two groups and connected in parallel, which when excited from a source of three phase alternating current as indicated provides a six pole rotating field.

For direct current excitation, terminals 46 and 47 are connected to a source of direct current while the other terminals are not connected to a source. Assuming current flow in the direction of the arrows in Figure 2 and as before clockwise current flow through a coil to provide excitation for a north pole, coils 30a and 29a provide excitation for a south pole, coils 23a and 24a provide excitation for a north pole, etc. Or grouping the coils, coils 1a, 2a, 3a, 4a, 5a, 6a, 7a, 8a and 9a provide excitation for a north pole, the next nine coils, namely 10a through 18a provide excitation for a south pole, the next nine coils provide excitation for a north pole, and the remaining nine coils provide excitation for a south pole.

Figure 3:
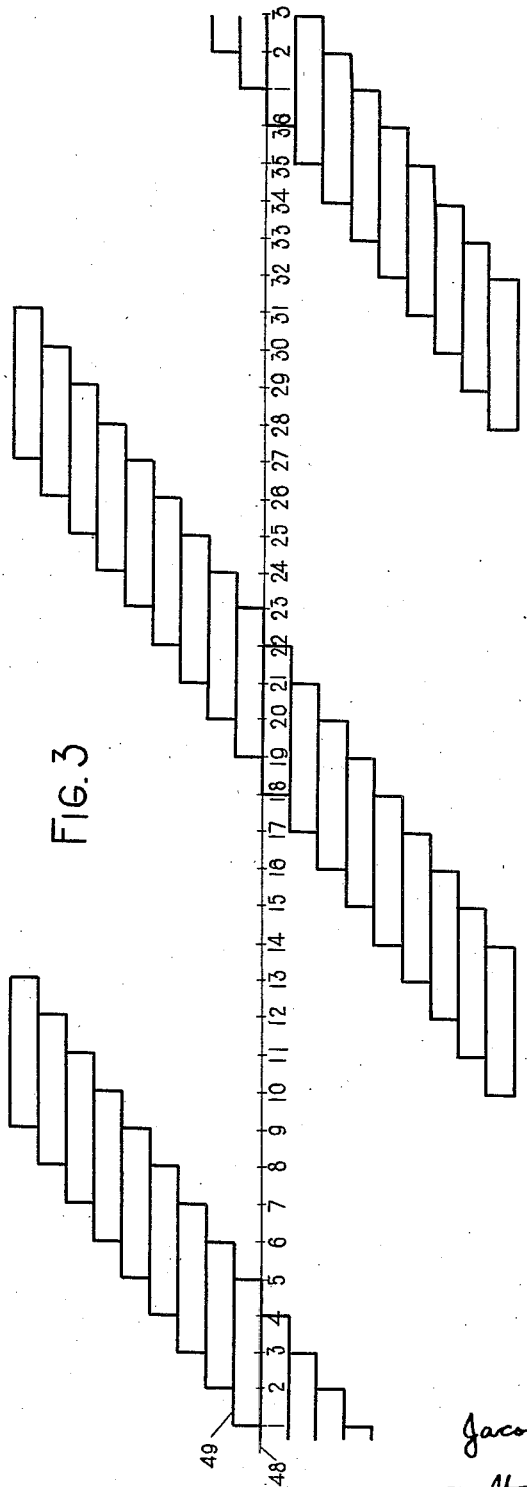
Figure 3 is a magnetomotive force diagram for the coils of the stator windings of Figure 1.
Figure 4:
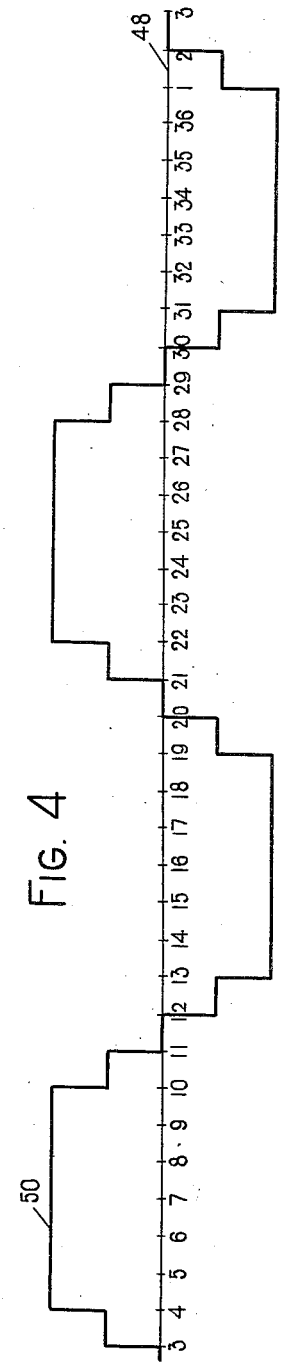
Figure 4 is a resultant flux diagram for the same.

The excitation provided by the coils, when connected to a direct current source, as described above, is diagrammatically illustrated in Figures 3 and 4. Figures 3 and 4, being of the same scale as Figure 1, may be aligned therewith to facilitate an understanding of the direct current excitation. The horizontal line 48 is a reference line above which the excitation may be regarded as positive, i. e., to provide north pole excitation and below which as negative, i. e., to provide south pole excitation. The numerals 1 to 36 inclusive indicate reference points corresponding to the slots of the stator. In Figure 3, the magnetomotive force of each coil is represented by a rectangular block 49. The length of these rectangles corresponds to the pitch of the coils while the height of each coil corresponds to the magnitude of the magnetomotive force. Thus the magnetomotive force due to coil 1a for example extends over the face of the stator from slot 1b to slot 5b, or from points 1 to 5 and is positive.

The resultant magnetomotive force is the algebraic sum of the heights of these rectangles over the area encompassed by the respective coils. This sum is shown in Figure 4 in which the line 50 represents the resultant magnetomotive force or, since the flux density produced by this magnetomotive force is directly proportional to the magnetomotive force, the line 50 is a diagrammatic representation of the flux density due to the stator winding on direct current excitation and the area under this line is the total flux entering the armature. The flux density is a maximum between slots corresponding to points 4 and 10, 13 and 19, 22 and 28, and 31 and 1. Between the slots corresponding to points 11 and 12, 20 and 21, 29 and 30, and 2 and 3, the flux density is zero, thereby providing neutral zones for the setting of the commutator brushes. Thus a four pole stationary field is provided when the stator winding is connected to a source of direct current.

The rotor or armature winding is illustrated as a multiple winding of the type used on direct current armatures, wound for a four pole stationary field and arranged in 24 slots. In the developed view shown in Figure 5, the coils of the armature winding are designated 1c, 2c, etc., while the slots are designated 1d, 2d, etc. The two terminals of each coil are connected to adjacent commutator bars, these bars being designated 1e, 2e, etc. A full pitch winding is illustrated, the sides of coil 1c, for example, being placed in slots 1d and 7d. The four brushes are designated 65, 66, 67 and 68, like brushes being connected together and to terminals 69 and 70. Corresponding points on the armature winding are connected together by equalizing connectors designated 51, 52, etc., 12 equalizing connectors being illustrated. For convenience, these equalizing connectors are illustrated as connected to the commutator bars.

Figure 5 is of the same scale as Figures 1, 3 and 4 and may be aligned therewith to facilitate understanding of the operation. Reference lines 71 are illustrated above the armature winding and in line with the connecting points of the equalizing connectors. These lines are laid off at the bottom in accordance with the spacing in electrical degrees on direct current excitation and at the top in accordance with the spacing in electrical degrees on alternating current excitation. Thus it is seen that on direct current excitation the equalizing connectors connect points on the armature winding spaced 360 electrical degrees and therefore of the same potential so that there is no current flow in the equalizing connectors other than that which might be due to some irregularity in manufacture.

On alternating current excitation, however, there being six poles instead of four, each line 71 is 45 electrical degrees apart instead of 30 as in direct current excitation. Therefore, on alternating current excitation the equalizing connectors connect points on the armature winding 540 (equivalent 180) electrical degrees apart so that these points are of equal but opposite potential. Thus, on alternating current operation the armature acts in effect as a definite pitch squirrel cage rotor winding.

Reference may now be had to Figure 6 which illustrates a control system for the above described motor utilized as an elevator hoisting motor. For convenience, a simple form of control system has been illustrated and various control and safety elements are not shown. The circuits are shown in "straight" or "across-the-line" form in which the coils and contacts of the electromagnetic switches are separated in such manner as to render the circuits as simple and direct as possible. The relationship of these coils and contacts may be seen from Figure 6s where the switches are arranged in alphabetical order and shown in spindle form with the coils and contacts aligned horizontally with the coils and contacts which they indicate in the wiring diagram.

The alternating current supply mains are designated I, II and III. A triple pole manually operated main line switch designated ML is provided for controlling the supply of current from the supply mains. The stator winding of the motor is designated EMS while the armature winding, which is illustrated as a conventional direct current armature, is designated EMA. A direct current generator is illustrated for supplying current to the elevator motor armature winding on direct current operation. The generator armature is designated GA, its separately excited field winding GF and its series field winding GSF. This generator is illustrated as driven by a three phase squirrel cage induction motor, the stator winding of which is designated DMS and the rotor of which is designated DMR. Current for the stator winding on direct current operation is derived from the alternating current supply mains through a transformer TR and rectifier RE1 connected across a secondary winding of the transformer. Another rectifier RE2 connected across another secondary winding of transformer TR is provided for supplying direct current for generator separately excited field winding GF, for the operating coils of the electromagnetic switches and for the brake release coil BR. R designates a resistance in circuit with generator field winding GF. CA is a condenser utilized for timing one of the control switches. GOV designates a governor utilized in the control system.

The control system illustrated is of the type in which both the starting and stopping of the car is controlled by an operator in the car. A car switch is provided in the car, the car switch segment being designated CS and the stationary contacts engaged thereby being designated CU1, CU2 and CU3 for up car travel and CD1, CD2 and CD3 for down car travel. UL and DL are contacts of levelling mechanism utilized to bring the car to an exact landing level in case it underruns or overruns a floor in stopping.

The electromagnetic switches have been designated as follows:

A, B, C  Stator alternating current excitation switches
D   Stator direct current excitation switch
DF  Down fast speed switch
DS  Down slow speed switch
E   Driving motor switch
F   Armature direct current control switch
G   Speed responsive switch
UF  Up fast speed switch
US  Up slow speed switch
X   Up fast speed interlock switch
Y   Down fast speed interlock switch Throughout the description which follows these letters will be applied to the coils of the above designated switches. Also, with reference numerals appended thereto they will be applied to the contacts of these switches, as for example contacts A1.

To start the car in the up direction, car switch segment CS is moved into position to bridge contacts CU1, CU2 and CU3. The bridging of contacts CU1 and CU3 completes a circuit for the coil of up fast speed interlock switch X. This switch operates to engage contacts X1 and to separate contacts X2. The separation of contacts X2 prevents the operation of up slow speed switch US and armature direct current control switch F as a result of the bridging of car switch contacts CU1 and CU2. The engagement of contacts X1 completes a circuit for the coil of up fast speed switch UF. Switch UF, upon operation, engages contacts UF1, UF2, UF3 and UF4 and separates contacts UF5. Contacts UF5 are interlock contacts in the circuit for the coil of down fast speed switch DF. Contacts UF1 and UF2 establish direction for the stator winding EMS of the hoisting motor, while contacts UF3 complete the circuit for brake release coil BR. At the same time contacts UF4 complete the circuits for the coils of stator alternating current excitation switches A, B and C. These switches operate to engage contacts A1, A2, B1 and C1 completing the circuits for the stator winding of the hoisting motor. The circuit to terminal 41 of the motor is from supply main I through contacts UF1 and A1. The circuit to terminals 46 and 47 is from supply main I through contacts UF1 and A2. The circuit to terminals 42 and 43 is from supply main II through contacts B1. The circuit to terminals 44 and 45 is from supply main III through contacts UF2 and C1. Thus the phase windings of the hoisting motor are connected in delta relationship to the supply mains for a phase rotation of the applied voltage for up car travel so that as the brake releases the car starts in the up direction. This excitation as previously described provides a six pole rotating field to cause operation of the hoisting motor at a fast speed.

As the car accelerates, the governor switch GOV closes completing a circuit for the coil of speed responsive switch G. Switch G operates to engage contacts G1 and to separate contacts G2. The engagement of contacts G1 completes a circuit for the coil of driving motor switch E. Switch E operates to engage contacts E1 and E2 completing a circuit for the driving motor stator winding EMS. The driving motor starts in operation, driving generator armature GA.

To stop the car at a landing the car switch segment is centered as the car approaches the landing, breaking the circuits for the coils of switches X, UF, A, B and C. Switches UF, A, B and C, upon dropping out, break the circuits for the stator winding of the hoisting motor. The dropping out of switch UF also breaks the circuit for brake release coil BR so that the brake is applied to slow down the car.

As the speed of the car decreases to a certain value, governor switch GOV opens to break the circuit for the coil of speed responsive switch G. Switch G, upon dropping out, engages contacts G2 and separates contacts G1. Contacts G2 complete the circuit for the coil of stator direct current excitation switch D through contacts E3, G2, X2 and Y1. Switch D, upon operation, separates contacts D2 to prevent energization of the coils of fast speed switches UF and DF. It also engages contacts D1 to connect terminals 46 and 47 of the stator winding EMS of the hoisting motor to rectifier RE1. This causes excitation of the stator of the hoisting motor as a four pole stationary field as previously explained.

Assume that the car has underrun the floor so that up levelling contacts UL are engaged at the time contacts G2 engage. Under such conditions, contacts G2 also complete a circuit through contacts UL, coil of up slow speed switch US, interlock contacts DS5, coil of armature direct current control switch F and contacts G2, X2 and Y1, causing the operation of switches US and F. Switch US, upon operation, engages contacts US1, US2, US3 and US4 and separates interlock contacts US5, while switch F, upon operation, engages contacts F1. The engagement of contacts F1 connects terminals 69 and 70 of the hoisting motor armature winding across the generator armature GA. The engagement of contacts US1 and US2 completes a circuit through generator separately excited field winding GF in a direction to cause generator armature GA to apply voltage to the hoisting motor winding of a polarity for continued up car travel. At the same time contacts US3 reestablish the circuit for the brake release coil to cause release of the brake. Contacts US4 reestablish the circuit for the coil of switch E, momentarily broken by the separation of contacts G1, condenser CA maintaining switch E operated during this period. The voltage of generator armature GA is correlated to the strength of the excitation of the stator winding and the number of armature conductors to cause the hoisting motor to operate as a direct current motor at a slow speed.

As the car reaches the landing up levelling contacts UL separate, breaking the circuit for the coils of switches US and F. Switch F, upon dropping out, breaks the generator armature motor armature loop circuit, while switch US, upon dropping out, breaks the circuit for the generator separately excited field winding. Switch US also breaks the circuit for the brake release coil causing the brake to be applied to bring the car to a stop at the landing level. Also, switch US breaks the circuit for the coil of switch E which drops out to break the circuit for stator winding DMS of the generator driving motor, shutting down the motor generator set. It also breaks the circuit for the coil of switch D which drops out to disconnect the stator winding from rectifier RE1.

Should the car overrun the landing, down levelling contacts DL are engaged at the time of the engagement of contacts G2 so that the circuit is completed for the coils of down slow speed switch DS and switch F. Switch DS, upon operation, engages contacts DS1, DS2, DS3 and DS4 and separates interlock contacts DS5. Switch F, as above, engages contacts F1 to complete the generator armature motor armature loop circuit. Contacts DS1 and DS2 establish a circuit for generator field winding GF for current flow therethrough in the opposite direction so that generator armature GA applies voltage to the hoisting motor armature winding to move the car in the down direction. Contacts DS3 reestablish the circuit for the release coil of the brake with the result that as the car is brought to a stop it is restarted in the down direction and returned to the floor. As the car reaches the landing, down levelling contacts DL separate breaking the circuit for the coils of switches DS and F. These switches drop out to cause the aplication of power to the hoisting motor armature to be discontinued and the brake to be applied to bring the car to a stop at the landing level. Also switch E drops out to shut down the motor generator set.

The car is started in the down direction by moving car switch segment CS downwardly to bridge contacts CD1, CD2 and CD3. This causes operation of down fast speed interlock switch Y and down fast speed switch DF instead of switches X and UF. Switch DF establishes direction for the elevator hoisting motor stator winding so that upon completion of the circuit for this winding the phase rotation of the applied voltage is for operating the car in the down direction. Otherwise operation of the system is similar to that set forth for starting the car in the up direction and will not be further described. The car may be operated at slow speed by moving the car switch segment into position bridging only contacts CU1 and CU2 or CD1 and CD2. In such event switch F and either switch US or switch DS are operated to cause operation of the hoisting motor on direct current as above described.

Thus it is seen that a motor is provided which acts as a polyphase alternating current motor for fast speed operation and which may be operated at a slow speed preparatory to stopping or for the levelling operation. There is no increase in size of the motor over that for a single speed polyphase alternating current motor to provide such fast speed operation. Owing to the fact that there is no fixed relation beween the speed on alternating current excitation and that on direct current excitation, as in the case for example of alternating current motors of different pole numbers, the speed on direct current operation may be as low as required to obtain the desired speed of operation of the car. As the power required to operate the car at slow speed is only a fraction of that required to operate it at fast speed, a small motor generator set may be utilize and the commutator of the motor may be small. While described for only one slow speed on direct current operation, it is to be understood that more than one speed may be provided, as for example, by controlling resistance in circuit with the generator field winding. The system of control illustrated is simply by way of example and, although a car switch control elevator system has been described, the invention is applicable to other forms of elevator systems such as push button control systems.

An important feature of the invention is the provision of an armature winding having equalizing connectors joining points of equal potential on direct current excitation and which serve on alternating current excitation as connectors for current flow in the armature conductors. This is satisfied by a multiple wound armature with equalizing connectors for all coils but it is to be understood that a less number of equalizing connectors may be employed, as for example by omitting every other one. The actual arrangement of the armature winding depends on the stator winding. The stator winding should provide at least four poles on direct current excitation as otherwise no points of equal potential are provided on the armature winding to which equalizing connections may be made. On alternating current excitation of the stator winding, a difference in potential is had at the points of connection of the equalizing connectors to cause current flow in the armature conductors when the number of poles is less than the number of poles on direct current excitation or greater than but not a multiple of the number of poles on direct current excitation. However, in a great many of these combinations, the current flow in the armature conductors on alternating current excitation would be insufficient for satisfactory operation. For elevators, it is preferred to have a combination of pole numbers in which on alternating current excitation the points of connection of the equalizing connectors are not less than 120 electrical degrees or more than 240 electrical degrees apart or any equivalent such as not less than 480 or more than 600 electrical degrees apart. Thus for example, a stator wound to provide eight poles on alternating current excitation and six poles on direct current excitation is considered practical. A combination in which the points of connection of the equalizing connectors on alternating current excitation are 180 electrical degrees apart, such as the combination illustrated, or equivalent would be an optimum arrangement.

In elevator operation, the number of poles of a polyphase alternating current hoisting motor is determined by the requirements of the particular installation. In the case of geared machines, such factors as gear size and sheave diameter have a direct bearing on the number of poles. Thus in the case of elevators, the number of stator poles on alternating current excitation is a given factor so that the stator is wound and provision for connection is made to provide a different number of poles on direct current excitation. It is preferred to provide a low number of poles on direct current excitation to minimize the number of brushes.

While described as applied to a three phase motor on alternating current excitation, it is to be understood that the invention is applicable to polyphase alternating current excitation of other numbers of phases. Also, while the stator winding has been described as adapted for mesh connection, it may be connected star. The mesh connection, however, admits of a more simple switching mechanism and minimizes the number of leads from the motor.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A control system for an electric motor adapted for operation on polyphase alternating current or on direct current and having a field winding and an armature winding, said control system comprising; means for connecting said field winding for polyphase alternating current excitation to provide a rotating field of a number of pairs of poles to cause operation of said motor at a fast speed; means for slowing down the motor upon discontinuance of said excitation; and means for connecting said field winding for direct current excitation and for causing direct current voltage to be applied to said armature winding to cause operation of said motor at a slow speed.

2. A control system for an electric motor adapted for operation on polyphase alternating current or on direct current and having a field winding and an armature winding, said control system comprising; means for connecting said field winding for polyphase alternating current excitation to provide a rotating field of a number of pairs of poles to cause operation of said motor at a fast speed; means for slowing down the motor upon discontinuance of said excitation; speed responsive means; and means responsive to said speed responsive means upon decrease of the motor speed to a certain value for connecting said field winding for direct current excitation and for causing direct current voltage to be applied to said armature winding to cause operation of said motor at a slow speed.

3. A control system for an electric motor adapted for operation as a polyphase alternating current motor or as a direct current motor and having a field winding and an armature provided with a commutator, brushes and equalizing conductors connecting points on the armature winding spaced 360 electrical degrees under the field excitation provided when the field winding has direct current excitation, said control system comprising; a source of polyphase alternating current; means for connecting certain points on said field winding to said alternating current source to provide a rotating field of a number of pairs of poles to cause operation of said motor at a fast speed; a source of direct current for said field winding; a direct current generator of a certain voltage, said generator having a field winding; a source of direct current for said generator field winding; means for slowing down the motor upon disconnection of said motor field winding from said alternating current source; and means for connecting certain points on said motor field winding to its direct current source, said brushes across said generator and said generator field winding to its source, the value of direct current supplied to said motor field winding, the value of direct current supplied to the generator field winding and the value of the direct current voltage applied to motor armature being such as to cause operation of the motor at a slow speed.

4. A control system for an electric motor adapted for operation as a polyphase alternating current motor or as a direct current motor and having a field winding so wound and adapted that, when certain points thereon are connected to a source of direct current, a stationary field of a certain number of pairs of poles is provided and, when certain points thereon are connected to a source of polyphase alternating current a rotating field of a different number of pairs of poles is provided and having an armature wound for the number of pairs of field poles provided when the field winding is connected for direct current operation and provided with a commutator, brushes and equalizing conductors connecting points on the armature winding spaced 360 electrical degrees under stationary field excitation, said control system comprising; a source of polyphase alternating current; means for connecting said field winding to said alternating current source to cause operation of said motor at a fast speed determined by said number of pairs of poles of rotating field produced thereby; means for controlling the phase rotation of the applied voltage to control the direction of rotation of the motor on fast speed operation; a polyphase rectifier connected to said alternating current source; a direct current generator of a certain voltage, said generator having a field winding; a source of direct current for said generator field winding; means for slowing down the motor upon disconnection of said motor field winding from said alternating current source; means for connecting said motor field winding across said rectifier to cause direct current to be supplied thereto, for connecting said brushes across said generator and for connecting said generator field winding to its direct current source to cause operation of said motor as a direct current motor, the value of the current supplied to said motor field winding, the value of current supplied to the generator field winding and the value of the voltage applied to motor armature being such as to cause operation of the motor at a slow speed; and means for controlling the polarity of excitation of said generator field winding to control the direction of rotation of said motor on slow speed operation.

JACOB DANIEL LEWIS.